United States Patent [19]

Journee

[11] Patent Number: 5,392,485
[45] Date of Patent: Feb. 28, 1995

[54] SCREEN WIPER APPARATUS INCLUDING CONTROLLED MEANS FOR VARYING THE WIPING FORCE

[75] Inventor: Maurice Journee, Le Bois Hédouin, France

[73] Assignee: Journee, Paul S.A., Colombes, France

[21] Appl. No.: 950,824

[22] Filed: Sep. 24, 1992

[30] Foreign Application Priority Data

Sep. 24, 1991 [FR] France .................. 91 11722

[51] Int. Cl.$^6$ .......................... B60S 1/32
[52] U.S. Cl. .................. 15/250.20; 15/250.35
[58] Field of Search ......... 15/250.20, 250.35, 250.34, 15/250.31, 250.19

[56] References Cited

U.S. PATENT DOCUMENTS

| 2,799,039 | 7/1957 | Oishei ............... | 15/250.20 |
| 4,718,139 | 1/1988 | Okuda et al. ........ | 15/250.20 |

FOREIGN PATENT DOCUMENTS

| 283849 | 9/1988 | European Pat. Off. | 15/250.20 |
| 0412804 | 2/1991 | European Pat. Off. | B60S 1/34 |
| 374669 | 7/1988 | Germany ............. | B60S 1/06 |
| 605228 | 5/1960 | Italy ................. | 15/250.20 |
| 211151 | 9/1986 | Japan ................ | 15/250.20 |
| 241751 | 10/1987 | Japan ................ | B60S 1/32 |
| 642188 | 8/1950 | United Kingdom ... | 138/81 |
| 1063668 | 12/1983 | U.S.S.R. ............ | 15/250.35 |

Primary Examiner—David A. Scherbel
Assistant Examiner—Gary K. Graham
Attorney, Agent, or Firm—Morgan & Finnegan

[57] ABSTRACT

A screen wiper apparatus, especially for a motor vehicle, is of the kind comprising a wiper arm which carries at least one wiper blade and which is mounted pivotally about a pivot axis on a drive head for the arm. Torque applying means, coupled between the drive head and the wiper arm, apply a wiping torque to the latter, and include at least one spring which applies a substantially constant nominal torque to the wiper arm. The torque applying means includes at least one complementary spring for applying a load to the wiper arm wherein that the algebraic value of this load is adjustable in such a way that the value of the wiping torque can be increased or reduced as a function of at least one operating parameter of the vehicle.

9 Claims, 2 Drawing Sheets

SCREEN WIPER APPARATUS INCLUDING CONTROLLED MEANS FOR VARYING THE WIPING FORCE

FIELD OF THE INVENTION

The present invention relates to a screen wiper apparatus, especially though not exclusively for a motor vehicle. In this specification, a "screen" means any surface that is to be swept by a wiper, and may typically be the windshield or rear window of a vehicle.

The invention is concerned more particularly with a screen wiper apparatus of the kind comprising a wiper arm which carries at least one wiper blade, for example by means of a blade carrier, the wiper arm being pivoted about a pivot axis on a drive head of the screen wiper, the drive head being arranged to be moved in back and forth oscillating (rotational) movement by means of a drive spindle so as to produce a wiping action of the wiper blade on the swept surface. The wiper blade is articulated on the blade carrier, which is part of, or fixed to, the arm; and the wiper blade, in operation, sweeps or wipes over the swept surface such as a motor vehicle windshield.

BACKGROUND OF THE INVENTION

In order to obtain correct wiping of the swept surface, it is necessary that the wiping strip of the screen wiper be urged into contact with the swept surface with a substantial pressure force, or wiping force. To this end, spring means are usually provided between the drive head and the remainder of the wiper arm. This spring means typically comprise a helical tension spring which applies a substantially constant nominal wiping torque to the wiper arm about the pivot axis of the latter, the effect being to urge the wiping strip of the blade against the swept surface with a wiping force or pressure.

Due to the design of such apparatus, the wiping strip is held in this way against the swept surface not only during wiping movement, but also when the wiper is parked, i.e. at rest and not in use. The nominal wiping force is thus permanently applied to the wiping strip, even when the wiper is parked, and it is found that the wiping strip retains a residual shape that results from its profile being pressed against the swept surface. This is detrimental to wiping performance. It is thus desirable to be able to reduce the nominal wiping force applied to the wiping strip when the wiper is parked.

In addition, the quality of wiping of the swept surface depends in operation on the magnitude of the wiping force which is applied to the wiping strip, and this magnitude depends, especially, on parameters such as the forward speed of travel of the vehicle, and the frequency of the wiping movement of the wiper itself.

It is in addition known to increase the wiping force by means of aerodynamic attachments which are mounted on the wiper arm. However, these devices do not enable the value of the wiping force to be adjusted to a desirable value, at least with any accuracy. In particular, they do not enable the wiping force to be varied in a controlled manner as a function of an operating parameter of the vehicle.

DISCUSSION OF THE INVENTION

An object of the invention is to overcome the above mentioned drawbacks.

According to the invention, screen wiper apparatus, especially for a motor vehicle, of the type comprising a wiper arm which carries at least one wiper blade and which is mounted for pivoting movement about a pivot axis on a drive head of the arm, with means operatively arranged between the drive head and the wiper arm so as to apply a wiping torque to the latter, the said means comprising at least one spring which applies a substantially constant nominal wiping torque to the wiper arm, is characterised in that the said means for applying a wiping torque further comprise complementary spring means which comprise at least one complementary spring for applying a load to the wiper arm, such that the algebraic value of the said load is adjustable in such a way that the value of the wiping torque can thereby be increased or reduced as a function of at least one operating parameter of the vehicle, the apparatus being further characterised in that the complementary spring means is in a neutral state when the value of the complementary torque is of zero magnitude.

The said complementary spring means preferably comprises two springs, at least one of which is a compression spring, and at least one of these complementary springs preferably has one end coupled to an actuator which is associated with the drive head.

The said complementary spring means may comprise a tension spring and a compression spring arranged in parallel; or such said tension spring and compression spring may be arranged concentrically with each other.

In the last mentioned case, the apparatus is preferably further characterised by a first coupling member coupled to the wiper arm and a second coupling member coupled to the actuator with each of the said coupling members comprising a thrust plate element for engagement with the corresponding end of the compression spring, together with a central hook for engagement with the corresponding end of the tension spring of the complementary spring means.

In a modified form of screen wiper apparatus in accordance with the invention in which the complementary spring means comprises two springs of which at least one is a compression spring, the said complementary spring preferably comprises two compression springs which are arranged consecutively on a support bar having a first end connected to the wiper arm, and an actuating thrust plate element is provided, the said thrust plate element being arranged between the two mutually facing ends of the two compression springs, the thrust plate element being mounted for sliding movement on the said bar portion and being coupled to the actuator.

In an apparatus as defined in the last preceding paragraph, in a preferred form, the thrust plate element constitutes the perforated base portion of a cylindrical barrel member, the skirt portion of which surrounds one of the two compression springs and is coupled to the actuator.

Preferably, the actuator comprises an output bar having a rack associated with at least one pinion which is driven in rotation by a motor.

Further features and advantages of the invention will appear more clearly from a reading of the detailed description of preferred embodiments of the invention which follows, and which is given by way of non-limiting example only and with reference to the accompanying drawings.

DESCRIPTION OF PREFERRED EMBODIMENTS OF THE INVENTION

Figure 1:
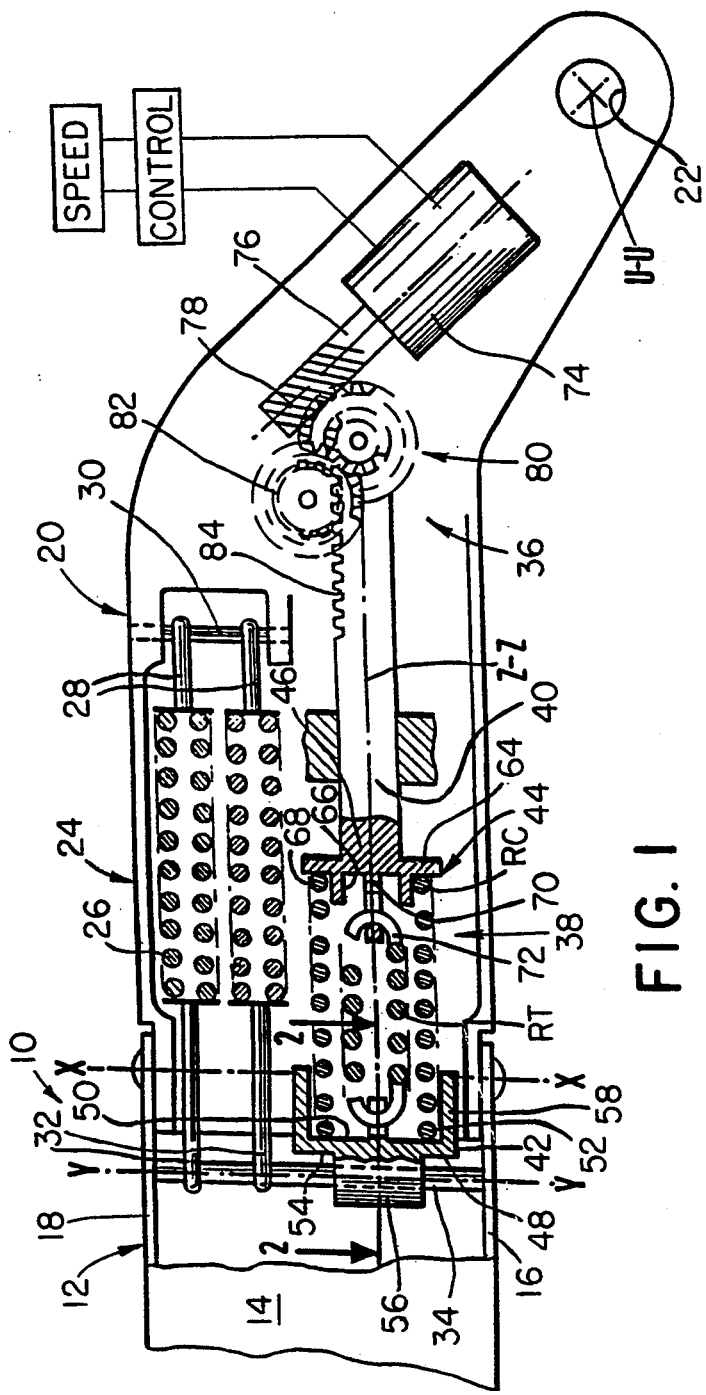
FIG. 1 is a top plan view, partially cut away, of a screen wiper apparatus in accordance with the present invention.
Figure 4:
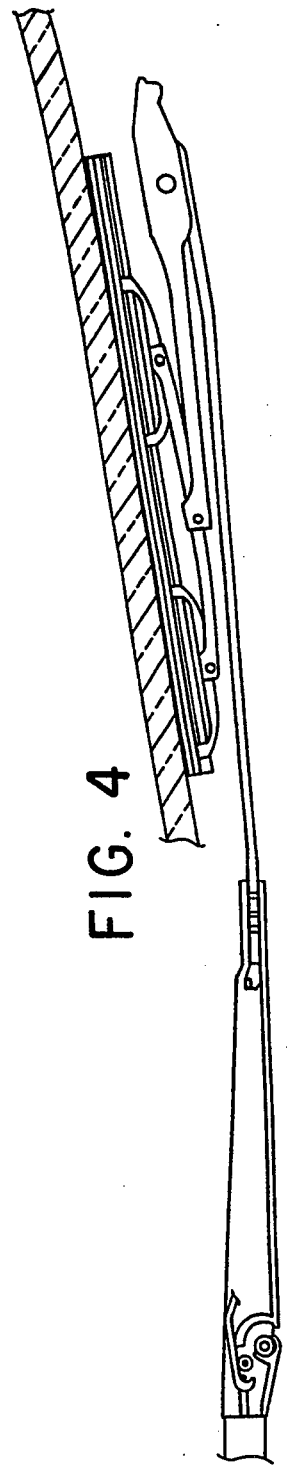
FIG. 4 is a plan view of a typical wiper blade.
Figure 2:
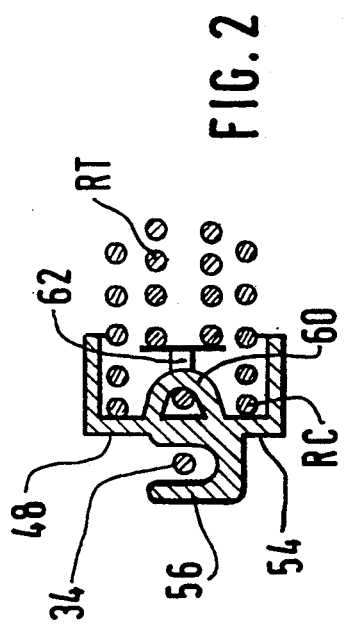
FIG. 2 is a detailed view, seen in cross section taken on the line 2—2 in FIG. 1.

The screen wiper apparatus 10 shown in FIGS. 1 and 2 includes a screen wiper arm 12, which also serves as a blade carrier. The portion shown in the drawings is in the form of a hollow profiled member, the profile of which is in the shape of an inverted U, defining a back portion 14 and two flanks or side elements 16 and 18, both of which are substantially at right angles to the back portion 14. The wiper arm 12 is articulated on a drive head 20, about a geometrical pivot axis X—X which extends in a direction substantially at right angles to the general direction of the wiper arm.

The drive head 20 includes, at that one of its ends which is furthest from the pivot axis X—X, a bore 22 defining an axis U—U at right angles to the pivot axis X—X. A drive spindle, not shown, is received in the bore 22. The drive spindle is connected to any suitable drive means, such as a windshield wiper motor (not shown), for giving the drive head 20 the usual back and forth oscillating wiping movement.

The screen wiper apparatus 10 includes torque applying means 24 for applying to the wiper arm 12 a wiping pressure or force of substantially constant value, orientated towards the swept surface (not shown), such as the windshield of the vehicle. In this example, the torque applying means 24 comprises two helical tension springs 26 arranged in parallel, and having two ends 28 which are hooked over a transverse bar 30 of the drive head 20. The opposite ends 32 of the two springs 26 are hooked over another transverse bar 34, defining a geometrical axis Y—Y parallel to the pivot axis X—X. The axis Y—Y lies below the axis X—X, that is to say it is closer than the latter to the swept surface, so that the springs 26 apply a nominal torque to the wiper arm 12 about its axis X—X. Consequently a wiping pressure is applied to the wiping strip of the conventional wiper blade (not shown) which is carried by the arm 12.

The screen wiper apparatus 10 also includes means for applying to the wiper arm 12 a complementary torque which enables the net value of the wiping pressure or force, as applied to the wiper blade, to be varied. In the embodiment shown in FIGS. I and 2, these complementary means consist essentially of an actuator 36 which is arranged in the drive head 20, together with a spring coupling device 38, which couples a sliding output or actuating bar 40 of the actuator 36 to the wiper arm 12.

The spring coupling device 38 includes a pair of complementary springs RT and RC. These consist of a tension spring RT and a compression spring RC, which are arranged in parallel with each other and which are mounted concentrically one inside the other. The two springs RT and RC thus extend substantially in the direction Z—Z in which the output bar 40 slides. The parallel mounting of the springs RT and RC is disposed between the free end 46 of the sliding actuating bar 40 and the transverse bar 34 of the wiper arm 12 on which the outer ends 32 of the springs 26 are hooked.

A first coupling member 42 and a second coupling member 44 are provided for the purpose of applying a compressive and/or tensile force to the springs RT and RC. The first coupling member 42 comprises a thrust plate element 48, and the first end 52 of the compression spring RC bears against the base 50 of the thrust plate element 48. The outer or rear face 54 of the thrust plate element 48 is formed with a hook 56, and the bar 34 is received in the crook of this hook 56. A lateral cylindrical skirt portion 58 extends from the base 50 towards the compression spring RC, for retaining the end 52 of the latter within the coupling member 42 and against lateral movement. Finally the thrust plate element 48 has a central ring portion 60. A first end 62 of the tension spring RT is hooked into this ring 60.

The second coupling member 44 has a structure substantially equivalent to that of the first coupling member 42, having a thrust plate element 64 comprising a cylindrical centering skirt 66 for cooperation with a second end 68 of the compression spring RC, together with a central ring 70 on which a second end 72 of the tension spring RT is hooked.

The actuator 36 comprises a rotary motor 74, which may typically be an electric motor. The output shaft 76 of this motor is formed as a helical gear 78 which transmits its rotary motion through a cascade of pinions, or gear train, 80 to a rack pinion 82 which cooperates with a rack 84 formed on the actuating bar 40. In this way the latter is actuated in sliding movement in either direction along the path Z—Z.

The apparatus is shown in FIG. 1 in its neutral state, corresponding to a complementary torque of zero magnitude applied to the wiper arm 12 by the spring coupling device 38. In this state, the springs RC and RT are not subjected to any resilient biassing force. When it is desired to increase the wiping torque, and thus the wiping pressure, the motor 74 is energised so that it rotates in the direction corresponding to an axial displacement of the output bar 40 towards the right as seen in FIG. 1, so as to increase the load which is applied to the tension spring RT. The spring RT then transmits this resilient load to the transverse bar 34. The tractive force applied by the spring RT then augments the force which is applied by the helical springs 26, and increases the wiping torque of the screen wiping apparatus.

When it is desired to reduce the wiping torque which is applied to the wiper arm 12, then, starting from the position shown in FIG. 1, the motor 74 is caused to rotate in the direction corresponding to an axial displacement of the bar 40 towards the left as seen in FIG. 1. This causes a supplementary load to be applied to the compression spring RC. This load is then transmitted to the transverse bar 34, and tends to oppose the nominal force which is applied to the latter by the springs 26. The force thus applied by the spring coupling device 38 is subtracted from the force applied by the springs 26. The nominal wiping torque, and thus the wiping pressure, is therefore reduced.

Figure 3:
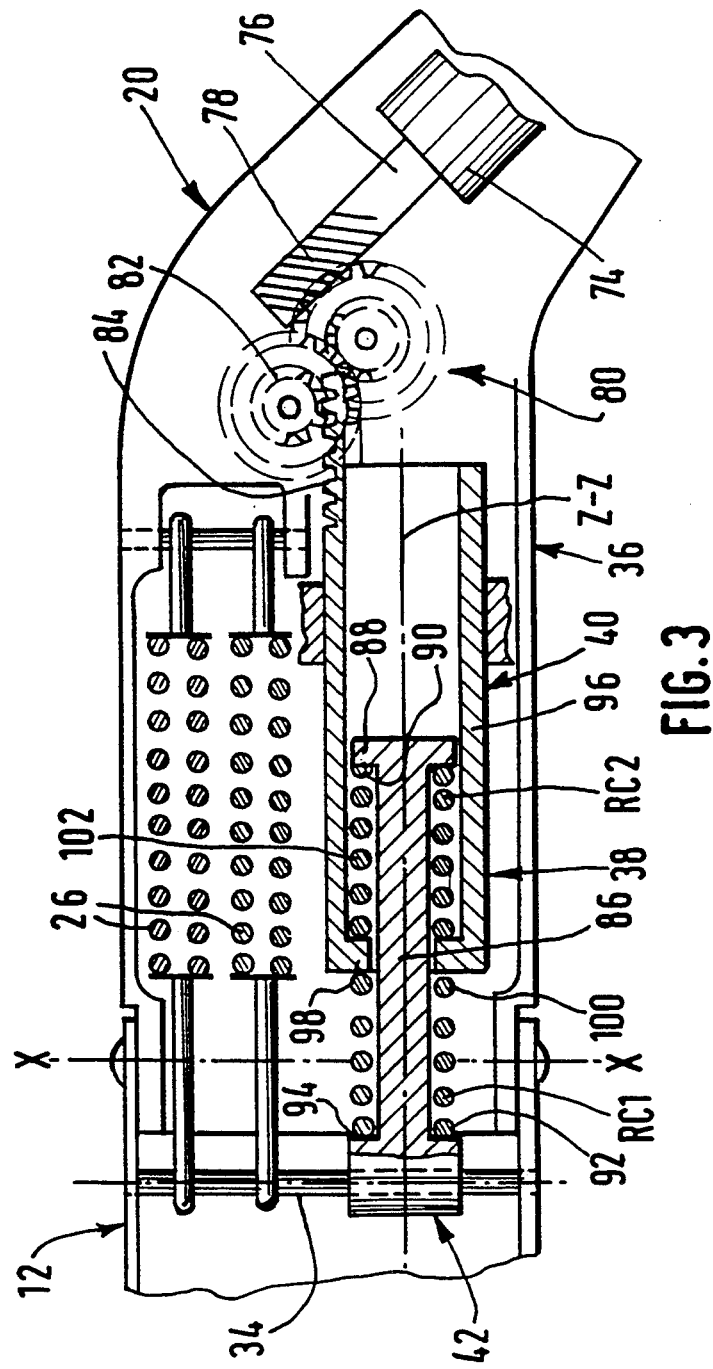
FIG. 3 is a view similar to FIG. 1, but showing a second embodiment of the complementary spring means of the apparatus.

Reference is now made to FIG. 3, in which members or components that are identical or equivalent to those in FIG. 1 are indicated by the same reference numerals.

In FIG. 3, the spring coupling device 38 comprises two helical compression springs RC1 and RC2 which are arranged in end to end relationship along the axis Z—Z. For this purpose, the coupling member 42, which (as in the embodiment described above with reference to FIGS. 1 and 2) is hooked on the transverse bar 34 of the wiper arm 12, is extended axially towards the right (as seen in FIG. 3), i.e. towards the actuator 36, by means of a central bar portion 86 on which the two compression springs RC1 and RC2 are mounted.

The free end of the bar portion 86, i.e. its end furthest from the transverse bar 34, is formed with an enlarged radial thrust plate element 88 having a radial shoulder, against which the second axial end, 90, of the compression spring RC2 is abutted. Similarly, the first axial end 92 of the compression spring RC1 bears against a radial thrust face 94 of the coupling member 42.

The output or actuating bar 40 of the actuator 36 is in the form of a hollow cylindrical barrel member 96 which surrounds the second compression spring RC2 and the radial thrust plate element 88. The left hand axial end of the barrel member 96 (as seen in FIG. 3) is formed with a radial thrust plate element 98 which has a central through hole. The barrel member 96 thus constitutes the second coupling member, the base portion 98 of which engages the two compression springs RC1 and RC2. For this purpose, the second end 100 of the first compression spring RC1, and the first end 102 of the second compression spring RC2, bear respectively against the opposed faces of the actuating element comprising the thrust plate element 98.

In the relaxed or neutral state of the apparatus shown in FIG. 3, which (as in the previous embodiments) corresponds to a complementary torque of zero magnitude, the two compression springs RC1 and RC2 are not subjected to any resilient biassing force. When it is desired to increase the wiping torque applied by the wiper arm 12 on to the swept surface, the motor 74 is energised so as to rotate in the direction corresponding to an axial displacement of the actuating member 40, in sliding movement, towards the right as seen in FIG. 3. This displacement is then converted into a corresponding displacement of the actuating element 98, which causes the compression spring RC2 to become compressed, thus transferring the force to the bar portion 86 of the coupling member 42 via the radial shoulder of the radial thrust plate element 88 of the latter. In this way an additional axial tractive force is applied to the transverse bar 34 of the wiper arm 12, in addition to the force applied by the helical springs 26.

Conversely, when it is desired to reduce the wiping torque, the motor 74 is caused to rotate in the direction corresponding to axial displacement of the member 40 towards the left as seen in FIG. 3, so that a compressive force is applied to the first compression spring RC1, which transfers this force to the transverse bar 34 via the thrust face 94 of the coupling member 42. This force tends to cause the wiper arm 12 to rotate in the direction opposed to the nominal wiping torque that is applied to it by the helical springs 26.

The actuator 36 is controlled by control means which may for example be in the form of electronic control means, arranged to operate so as to cause the complementary torque to vary as a function of at least one operating parameter of the vehicle. The control characteristic, or control law, which is applied to the actuator 36 may for example have as its main function that of reducing the value of the wiping force when the wiper is parked, that is to say when the wiping strip of the wiper blade is in its parked position, with no wiping of the swept surface taking place.

The control means may equally well be arranged to cause the value of the wiping pressure to vary during actual operation of the screen wiper, that is to say while the swept surface is being swept. To this end, the control characteristic may for example be arranged to provide that the complementary torque is of zero magnitude in normal operation of the wiper, that is to say the wiping pressure then depends on the nominal torque resulting from the action of the springs 26, together with aerodynamic and frictional effects.

The control characteristic may also be arranged to increase the value of the wiping force by applying a complementary torque which augments the nominal torque, for example when the speed of the vehicle exceeds a predetermined pressure.

It will of course be realised that the control characteristic for the actuator 36 is not limited to the various examples of modes of operation mentioned above. For example, it is possible to increase the value of the wiping pressure at a relatively low travelling speed of the vehicle, in a mode in which the swept surface is being washed. Similarly, it is possible to cause the wiping pressure to be varied as a function of the frequency and/or wiping speed of the wiper.

In general, the invention is not limited to the embodiments described above or the particular variations thereon which have been mentioned. It is for example possible to use any type of actuator instead of the motor 42 with its rack and pinion mechanism. It is also possible to act on the springs 38 by means of a cam system, in which the profile of the cam that is used determines the control characteristic for variation of the complementary torque.

The value of the complementary torque which is applied by means of the actuator 36 can be such that it virtually cancels out the value of the nominal torque entirely. However, in most applications, the absolute value of the complementary torque corresponds to a proportion of the nominal torque applied by the springs 26, this proportion being typically around 25%.

It will be noted that the use of complementary means, that is to say means independent of the springs 26, to apply a torque in one direction or another to the wiper arm 26, has the beneficial consequence that the springs 26 are not subjected to significant variations in their tension. They may therefore be so designed and calibrated so as to give a substantially constant value of tractive force. This leads to high reliability in use.

The fact of applying a complementary torque corresponding only to a proportion of the nominal torque also ensures that a wiping pressure that enables the wiper to operate, will always be present regardless of the particular position in which the actuator 36 finds itself.

What is claimed is:

1. Screen wiper apparatus comprising: a drive head having a pivot axis; a wiper arm; means mounting the wiper arm on the drive head for pivoting movement with respect to the drive head about the pivot axis; at least one wiper blade carried by the wiper arm; and torque applying means having a first spring means for applying a substantially constant nominal-wiping, torque to the wiper arm and a second spring means for having a neutral state and for applying a complimentary torque to the wiper arm, said second spring means having a neutral state in which it applies no torque into the wiper arm, the torque applying means being coupled between the drive head and the wiper arm for applying a wiping torque to the wiper arm, the second spring means applying a load to the wiper arm in which the algebraic value of the load is adjustable and can be additive and subtractive to the constant nominal torque such that the wiping torque applied to the wiper arm can be increased and can be reduced from the first spring means constant torque in response to vehicle operation, the second spring means neutral state defined by the value of the complementary torque being of zero magnitude.

2. Screen wiper apparatus according to claim 1, wherein the second spring means comprises two springs, at least one of which is a compression spring.

3. Screen wiper apparatus according to claim 2, further comprising an actuator in the drive head, at least one spring of the second spring means having one end thereof coupled to the actuator.

4. Screen wiper apparatus comprising: a drive head having a pivot axis; a wiper arm; means mounting the wiper arm on the drive head for pivoting movement with respect to the drive head about the pivot axis; at least one wiper blade carried by the wiper arm: torque applying means including a first spring means for applying substantially constant nominal torque to the wiper arm and a second spring means for applying a complementary torque to the wiper arm, said second spring means having a neutral state in which it applies no torque to the wiper arm, the torque applying mean being coupled between the drive head and the wiper arm for applying a wiping torque to the wiper arm: the second spring means applying a load to the wiper arm in which the algebraic value of the load is adjustable and can be additive and subtractive to the constant nominal torque such that the wiping torque applied to the wiper arm can be increased and can be reduced from the first spring means constant torque in response to vehicle operation, the second spring means neutral state defined by the value of the complementary torque being of zero magnitude, the second spring means having two springs, an elongated compression spring and an elongated tension spring that is mounted in parallel with the compression spring.

5. Screen wiper apparatus comprising: a drive head having a pivot axis; a wiper arm; means mounting the wiper arm on the drive head for pivoting movement with respect to the drive head about the pivot axis; at least one wiper blade carried by the wiper arm; torque applying means including a first spring means for applying a substantially constant nominal torque to the wiper arm and a second spring means for having a neutral state and for applying a complementary torque to the wiper arm, said second spring means having a neutral state in which it applies no torque to the wiper arm, the torque applying means being coupled between the drive head and the arm for applying a wiping torque to the wiper arm; the second spring means applying a load to the wiper arm in which the algebraic value of the load is adjustable and can be additive and subtractive to the constant nominal torque such that the wiping torque applied to the wiper arm can be increased and can be reduced from the first spring means constant torque in response to vehicle operation, the second spring means neutral state defined by the value of the complementary torque being of zero magnitude, the second spring means having two springs, an elongated compression spring and an elongated tension spring that is mounted in parallel with the compression spring, the tension and compression springs of the second spring means are helical springs mounted concentrically with each other.

6. Screen wiper apparatus according to claim 5 wherein the second spring means further comprises an actuator coupled to the drive head, a first coupling member connected to the wiper arm and a second coupling member connected to the actuator, each of the coupling members having a respective thrust plate element for engagement in end thrust relationship with a corresponding end of the compression spring of the second spring means, and a central hook for engagement with a corresponding end of the tension spring of the second spring means.

7. Screen wiper apparatus comprising: a drive head having a pivot axis: a wiper arm: means mounting the wiper arm on the drive head for pivoting movement with respect to the drive head about the pivot axis: at least one wiper blade carried by the wiper arm; and torque applying means including a first spring means for applying a substantially constant nominal torque to the wiper arm and a second spring means for applying a complementary torque to the wiper arm, said second spring means having a neutral state in which it applies no torque to the wiper arm, the torque applying means being coupled between the drive head and the wiper arm for applying a wiping torque to the wiper arm: the second spring means applying a load to the wiper arm in which the algebraic value of the load is adjustable and can be additive and subtractive to the constant nominal torque such that the wiping torque applied to the wiper arm can be increased and can be reduced from the first spring means constant torque in response to vehicle operation, the second spring means neutral state defined by the value of the complementary torque being of zero magnitude, the second spring means having an actuator in the drive head and first and second elongated compression springs the first compression spring of the second spring means having one end thereof coupled to the actuator; an elongated support bar having a first end connected to the wiper arm, the first and second compression springs in said second means being mounted end-to-end with respect to each other on the support bar; the second spring means of the apparatus having a thrust plate element interposed between the two ends of the compression springs and being mounted for sliding movement on the support bar, and means coupling the thrust plate element with the actuator.

8. Screen wiper apparatus according to claim 7, wherein the means coupling the thrust plate element with the actuator comprises an elongated hollow barrel member the thrust plate element forming a base portion at one end of the barrel member, said base portion coupling the thrust plate element to the actuator and said barrel member surrounding at least one of the two compression springs.

9. Screen wiper apparatus comprising: a drive head having a pivot axis; a wiper arm; means mounting the wiper arm on the drive head for pivoting movement with respect to the drive head about the pivot axis; at least one wiper blade carded by the wiper arm; and torque applying means having a first spring means for applying a substantially constant nominal torque to the wiper arm and a second spring means for applying a complementary torque to the wiper arm, said second spring means having a neutral state in which it applies no torque to the wiper arm, the torque applying means being coupled between the drive head and the wiper arm for applying a wiping torque to the wiper arm, the second spring means applying a load to the wiper arm in which the algebraic value of the load is adjustable and can be additive and subtractive to the constant nominal torque such that the wiping torque applied to the wiper arm can be increased and can be reduced from the first spring means constant torque in response to vehicle operation, the second spring means neutral state defined by the value of the complementary torque being of zero magnitude; the second spring means having two elongated springs, at least one of which is a compressing spring, an actuator in the drive head, at least one spring of the second spring means having one end thereof coupled to the actuator; said actuator comprising an output bar, a rack carried by the output bar, a motor, and gear means coupled to the motor for rotation thereby and in engagement with the said rack.

* * * * *